May 16, 1961
T. FRANZEN
2,984,524
ROAD WHEEL WITH VULCANIZED WEAR RING
Filed April 15, 1957
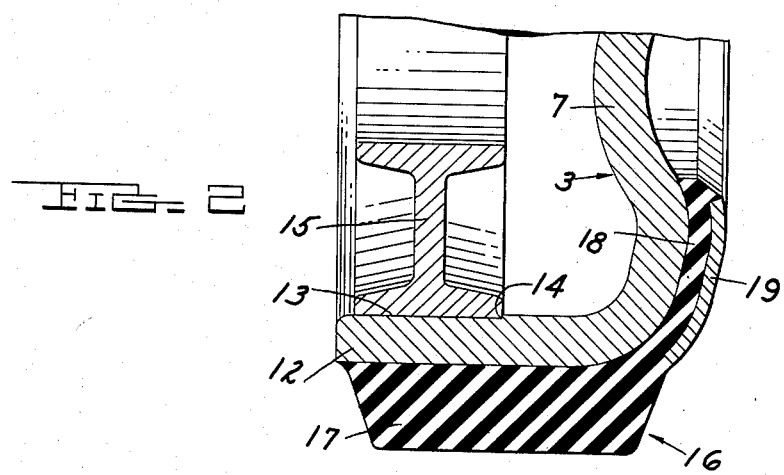
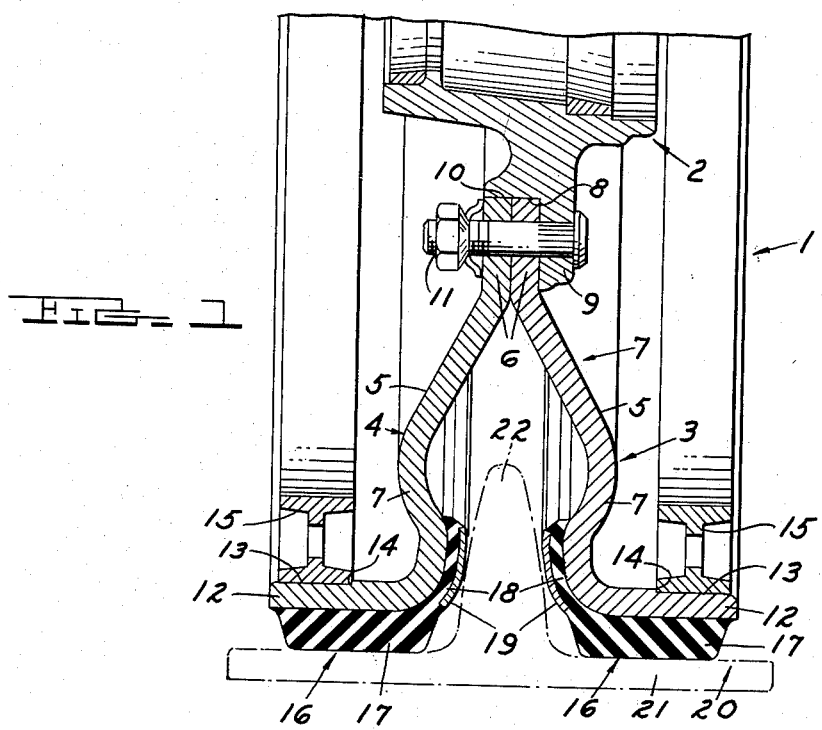
INVENTOR.
TORE FRANZEN
BY
Whittemore, Hulbert & Belknap
ATTORNEYS United States Patent Office 2,984,524
Patented May 16, 1961

2,984,524

ROAD WHEEL WITH VULCANIZED WEAR RING

Tore Franzen, Grosse Pointe Park, Mich., assignor to Kelsey-Hayes Company, Detroit, Mich., a corporation of Delaware Filed Apr. 15, 1957, Ser. No. 652,722

6 Claims. (Cl. 305—56)

This invention relates to wheels and refers more particularly to a dual road wheel structure for a track laying vehicle.

The invention has for one of its objects to provide a road wheel for a track laying vehicle which is light weight in construction and has a wear member yieldably mounted thereon for guiding the track.

The invention has for another object to provide a road wheel for a track laying vehicle having a wear ring and a resilient mounting for permanently securing the wear ring on the wheel.

The invention has for still another object to provide a dual road wheel structure for a track laying vehicle which includes a pair of axially spaced wheel members and an annular member of resilient material such as rubber associated with each of the spaced wheel members. The annular members include tire portions encircling and secured to the rims of the spaced wheel members and mounting portions extending radially inwardly from the tire portions into the space between the wheel members and secured to the body portions thereof. Hardened wear rings are permanently secured to the mounting portions of the annular members and have spaced opposed wear resisting surfaces for guiding a track of the vehicle.

Other objects and features of the invention will become apparent as the description proceeds, especially when taken in conjunction with the accompanying drawing, illustrating a preferred embodiment of the invention, wherein:

Fig. 1 is a radial sectional view of a portion of a dual road wheel structure embodying the invention.

Fig. 2 is an enlarged radial sectional view of a portion of the structure shown in Fig. 1.

Referring now more particularly to the drawing, the dual road wheel structure 1 there illustrated has the hub 2 and the pair of identical wheel members 3 and 4. The wheel members 3 and 4 are concentric with the axis of rotation of the dual wheel structure 1 and each includes a generally radially extending annular disc-like body part 5. The body parts 5 each have a central annular bolting-on portion 6 and an annular web portion 7. The body parts 5 are mounted in reverse relation, as indicated in Fig. 1, in the annular recess 8 formed in the hub flange 9, the bolting-on portions each having a central circular opening 10 for this purpose. The wheel members 3 and 4 are secured to the hub flange by a plurality of nut and bolt assemblies 11, one of which is shown in Fig. 1. The web portions of the body parts 5 are flared away from each other and are spaced from each other.

Each of the wheel members 3 and 4 has a generally axially extending annular flange defining a rim part 12, and the rim parts are concentric with the axis of rotation of the dual wheel structure 1 and extend away from each other or axially outwardly from a median plane perpendicular to the axis of rotation of the dual wheel structure.

The wheel members 3 and 4 are preferably formed of a lightweight material such as aluminum and are each in the form of a one-piece stamping.

Each rim part has an axially extending cylindrical radially inner surface 13 extending from the axially outer edge of the rim part to the annular radially inwardly extending shoulder 14. An annular reinforcing ring 15 of I-shaped cross-section extends within and frictionally engages the cylindrical surface 13 of each rim part in abutting relation with shoulder 14. The ring 15 may be assembled with the associated wheel member 3 or 4 by heating the wheel member to expand it, inserting the reinforcing ring into position within the rim part against shoulder 14, and allowing the wheel member to cool and shrink upon the reinforcing ring. The reinforcing ring is also preferably of a lightweight material such as aluminum.

An annular member or ring 16 of resilient stretchable and yieldable material such as rubber is provided for each of the wheel members 3 and 4. Each annular member 16 includes an annular tire portion 17 which encircles and is bonded to the rim part of the associated wheel member 3 or 4 by vulcanizing. Each annular member 16 also includes an annular mounting portion 18 which extends generally radially inwardly from the tire portion and is bonded to the body and rim parts 5 and 12 by vulcanizing. It will be understood that the entire surface of the members 16 which engage the wheel members 3 and 4 are permanently secured directly thereto by vulcanizing.

A wear member or ring 19 is embedded in each mounting portion 18 and permanently secured or bonded directly thereto by vulcanizing. The wear rings are concentric with the axis of rotation of the dual wheel structure 1 and of the wheel members 3 and 4 and are spaced apart, having exposed confronting wear resisting surfaces. The wear rings have the cross-section shown and are preferably formed of hardened steel.

A track 20 is associated with the dual wheel structure 1 and an ordinary track laying vehicle will have a plurality of dual wheel structures 1 all associated with the track 20. The track 20 includes track elements 21 formed with radially inwardly extending projections or lugs 22 which extend into the space between the wear rings. The wear rings guide the track and limit axial movement thereof by engagement with the projections 22.

This construction of dual wheel is light in weight, yet it provides hardened wear resisting surfaces for guiding the lugs of the track. The mounting portions 18 are integral with the tire portions 17 to provide a convenient mounting for the wear rings. Moreover, this mounting for the wear rings is yieldable and resilient to cushion the wear rings by permitting a degree of axial movement thereof.

What I claim as my invention is:

1. Road wheel structure for a track laying vehicle, comprising a pair of wheel members secured together in side-by-side co-axial relation for rotation as a unit, said wheel members including generally radial body parts, said body parts having radially outer portions which are spaced apart axially, said wheel members also including axially spaced rim parts at the peripheries of said radially outer portions of said body parts, annular members of resilient material for said wheel members, said annular members having annular tire portions encircling and secured to said respective rim parts, said annular members also having annular mounting portions integral with said tire portions, said annular mounting portions extending radially inwardly from said tire portions and into the space between said radially outer portions of said body parts, each annular mounting portion extending along and being secured to the radially outer portion of the associated body part, said mounting portions being spaced apart axially, and annular wear rings secured to said annular mounting portions, said wear rings being co-axial with said wheel members and having exposed wear resisting surfaces opposed to each other in axially spaced relation and cooperable with each other to guide a track of a track laying vehicle.

2. The road wheel defined in claim 1 in which said mounting portions are the sole supports for said wear rings, said wear rings being otherwise free of connection with said wheel members.

3. Road wheel structure for a track laying vehicle, comprising a pair of wheel members secured together in side-by-side co-axial relation for rotation as a unit, said wheel members including generally radial body parts, said body parts having radially outer portions which are spaced apart axially, said wheel members also including rim parts projecting axially from the peripheries of said radially outer portions of said body parts in directions away from each other, annular members of resilient material for said wheel members, said annular members having annular tire portions encircling and bonded in surface-to-surface relation to said respective rim parts, said annular members also having annular mounting portions integral with said tire portions, said annular mounting portions extending radially inwardly from said tire portions and into the space between said radially outer portions of said body parts, each annular mounting portion extending along and being bonded in surface-to-surface relation to the radially outer portion of the associated body part, said mounting portions being spaced apart axially, and annular wear rings bonded in surface-to-surface relation to said annular mounted portions, said wear rings being co-axial with said wheel members and having exposed wear resisting surfaces opposed to each other in axially spaced relation and cooperable with each other to guide a track of a track laying vehicle.

4. The road wheel defined in claim 3 in which said mounting portions are the sole supports for said wear rings, said wear rings being otherwise free of connection with said wheel members.

5. The road wheel structure defined in claim 4 in which said wear rings are partially imbedded in said mounting portions.

6. The road wheel structure defined in claim 5 in which said wheel members are in the form of one-piece stampings.

References Cited in the file of this patent

UNITED STATES PATENTS

| | | |
|---|---|---|
| 1,632,512 | Serva | June 14, 1927 |
| 2,329,901 | Herrington | Sept. 21, 1943 |
| 2,355,942 | Ash | Aug. 15, 1944 |
| 2,397,719 | Ash | Apr. 2, 1946 |

FOREIGN PATENTS

| | | |
|---|---|---|
| 720,092 | Germany | Apr. 2, 1942 |
| 734,380 | Germany | Apr. 14, 1943 |
| 737,756 | Germany | July 22, 1943 |